United States Patent
Toh et al.

(10) Patent No.: US 8,159,620 B2
(45) Date of Patent: Apr. 17, 2012

(54) RECEIVER FOR DIFFERENT TYPES OF RECEPTION SIGNALS

(75) Inventors: Yeow T. Toh, Singapore (SG); Kam C. Kwong, Singapore (SG)

(73) Assignee: NXP B.V., Eindhoven (NL)

( * ) Notice: Subject to any disclaimer, the term of this patent is extended or adjusted under 35 U.S.C. 154(b) by 818 days.

(21) Appl. No.: 11/996,483

(22) PCT Filed: Jul. 20, 2006

(86) PCT No.: PCT/IB2006/052483
§ 371 (c)(1),
(2), (4) Date: Nov. 20, 2008

(87) PCT Pub. No.: WO2007/015185
PCT Pub. Date: Feb. 8, 2007

(65) Prior Publication Data
US 2009/0091663 A1   Apr. 9, 2009

(30) Foreign Application Priority Data
Aug. 1, 2005   (EP) .................................... 05107087

(51) Int. Cl.
*H04N 5/46* (2006.01)
*H04N 5/44* (2006.01)

(52) U.S. Cl. ........ 348/729; 348/725; 348/553; 348/555; 348/731; 455/143; 455/142

(58) Field of Classification Search .................. 348/729, 348/725, 726, 553, 555, 731, 732; 455/143, 455/138, 140, 142, 144, 146, 179.1, 180.1, 455/180.2, 272, 275; 375/316, 328
See application file for complete search history.

(56) References Cited

U.S. PATENT DOCUMENTS

| | | | | |
|---|---|---|---|---|
| 2,650,265 A * | 8/1953 | Mountjoy | ...................... | 348/729 |
| 5,878,087 A | 3/1999 | Ichihara | | |
| 5,881,369 A | 3/1999 | Dean et al. | | |
| 6,154,505 A * | 11/2000 | Konishi et al. | ................ | 375/321 |
| 6,731,348 B2 * | 5/2004 | Osada et al. | ................... | 348/729 |
| 6,788,747 B1 * | 9/2004 | Okanobu | ...................... | 375/316 |
| 7,151,577 B2 * | 12/2006 | Yamamoto et al. | ........... | 348/729 |
| 2002/0158992 A1 | 10/2002 | Yeo et al. | | |

FOREIGN PATENT DOCUMENTS

| | | |
|---|---|---|
| EP | 0715417 A2 | 6/1996 |
| EP | 0793356 A2 | 9/1997 |
| EP | 0945990 A1 | 9/1999 |
| EP | 1085664 A2 | 3/2001 |
| GB | 2101826 A | 1/1983 |

* cited by examiner

*Primary Examiner* — Jefferey Harold
*Assistant Examiner* — Jean W Desir

(57) ABSTRACT

A receiver can handle different types of reception signals, such as, for example, TV and FM-radio signals. In the receiver, a mixer (MIX) mixes a reception signal with an oscillator signal (OOS) so as to obtain a mixer output signal (MOS), which comprises a frequency-shifted version of the reception signal. An intermediate frequency amplifier (IFAMP) applies an amplified mixer output signal (MOSA) to two different intermediate frequency filters: one for first type reception signals and another for second type reception signals. A switchable coupling section (DBTP, SWA) is coupled between the mixer (MIX) and the intermediate frequency amplifier (IFAMP). The switchable coupling section (DBTP, SWA) is switchable to a first state and a second state. In the first state, the mixer output signal (MOS) substantially reaches an input (IAD) of the intermediate frequency amplifier (IFAMP) via a first coupling path (DTBP). In the second state, the mixer output signal (MOS) substantially reaches the input (IAD) of the intermediate frequency amplifier (IFAMP) via a second coupling path (SWA).

13 Claims, 3 Drawing Sheets

RECEIVER FOR DIFFERENT TYPES OF RECEPTION SIGNALS

FIELD OF THE INVENTION

An aspect of the invention relates to a receiver, which can handle different types of reception signals, such as, for example, television (TV) and FM-radio signals. The receiver may be, for example, in the form of a so-called add-on board that can be plugged into a personal computer or any other type of multimedia apparatus. Other aspects of the invention relate to a method of controlling a receiver, a computer program product for a receiver, and an audiovisual system.

DESCRIPTION OF PRIOR ART

US patent application published under number 2002/0158992 describes a receiver for both TV and FM radio. In the receiver, antenna signals are applied to a cascade connection of a filter, a mixer, and an intermediate frequency amplifier. An output of the intermediate frequency amplifier is applied to a ceramic filter having an output connected to an FM sound demodulator. The output of the intermediate frequency amplifier is also applied to a surface acoustic wave filter having an output that is connected to a television intermediate frequency processor.

SUMMARY OF THE INVENTION

According to an aspect of the invention, a receiver, which can handle different types of reception signals, has the following characteristics. A mixer mixes a reception signal with an oscillator signal so as to obtain a mixer output signal, which comprises a frequency-shifted version of the reception signal. An intermediate frequency amplifier applies an amplified mixer output signal to two different intermediate frequency filters: one for first type reception signals and another for second type reception signals. A switchable coupling section is coupled between the mixer and the intermediate frequency amplifier. The switchable coupling section is switchable to a first state and a second state. In the first state, the mixer output signal substantially reaches an input of the intermediate frequency amplifier via a first coupling path. In the second state, the mixer output signal substantially reaches the input of the intermediate frequency amplifier via a second coupling path.

The invention takes the following aspects into consideration. A receiver that can handle different types of reception signals may have a common signal processing path, which includes a mixer and an intermediate frequency amplifier. A split is made at an output of the intermediate frequency amplifier, which is coupled to two different intermediate frequency filters, one for one type of reception signal and another for another type of reception signal. The aforementioned prior art is an example of such an architecture.

An intermediate frequency filter has generally an insertion loss, which may be relatively high. The common signal processing path should provide sufficient gain to compensate for this insertion loss so as to achieve satisfactory noise figure. The common signal processing path will inevitably generate spurious signals, such as, for example intermodulation products which are due to nonlinearity in signal transfer characteristics. In general it holds that, the higher the gain a signal processing element provides, the stronger the intermodulation products that the signal processing element will produce. A compromise needs to be made between noise and intermodulation.

The gain of the common signal processing path is preferably concentrated in the intermediate frequency amplifier, which handles relatively low frequencies. It is easier to make gain, as it were, at lower frequencies than that at higher frequencies. There is less risk of instability. Moreover, the lower the frequency is, the more linear a signal transfer characteristic can be. Nevertheless, the intermediate frequency amplifier will be a critical element in terms of making a compromise between noise and intermodulation. In that sense, the intermediate frequency amplifier may be more critical for the one type of reception signal than for the other type of reception signal.

A common filter, which is coupled between the mixer and the intermediate frequency amplifier, may provide a better compromise between noise and intermodulation. The common filter is preferably designed so that spurious signals are attenuated to a certain extent, in particular with regard to the type of reception signal for which the intermediate frequency amplifier is most critical. In any case, the common filter should provide a pass band filter characteristic that accommodates for the one and the other type of reception signal. In addition, the common filter should preferably have a modest insertion loss with respect to the one and the other type of reception signal. New compromises need to be made. An implementation of the common filter, which effectively improves the compromise between noise and intermodulation for the one and the other type of reception signal, will generally be complicated and, therefore, costly.

In accordance with the aforementioned aspect of the invention, a switchable coupling section is coupled between the mixer and the intermediate frequency amplifier. The switchable coupling section is switchable to a first state and a second state. In the first state, the mixer output signal substantially reaches an input of the intermediate frequency amplifier via a first coupling path. In the second state, the mixer output signal substantially reaches the input of the intermediate frequency amplifier via a second coupling path.

One of the aforementioned coupling paths can be designed so that a satisfactory compromise between noise and distortion is achieved for the type of reception signal for which the intermediate frequency amplifier is most critical. Since the other type of reception signal reaches the intermediate frequency amplifier via the other coupling path, there is no need to make a compromise between respective signal transfers from the mixer to the intermediate frequency amplifier for the one and the other type of reception signal. Complicated filter structures can be avoided. Consequently, although, in accordance with the invention, there are two different coupling paths between the mixer and the intermediate frequency amplifier, instead of a common coupling path, an implementation in accordance with the invention will generally be less expensive compared with a common coupling path implementation for a comparable level of performance. For those reasons, the invention allows a relatively good quality of reception at relatively modest cost.

These and other aspects of the invention will be described in greater detail hereinafter with reference to drawings.

DETAILED DESCRIPTION

Figure 1:
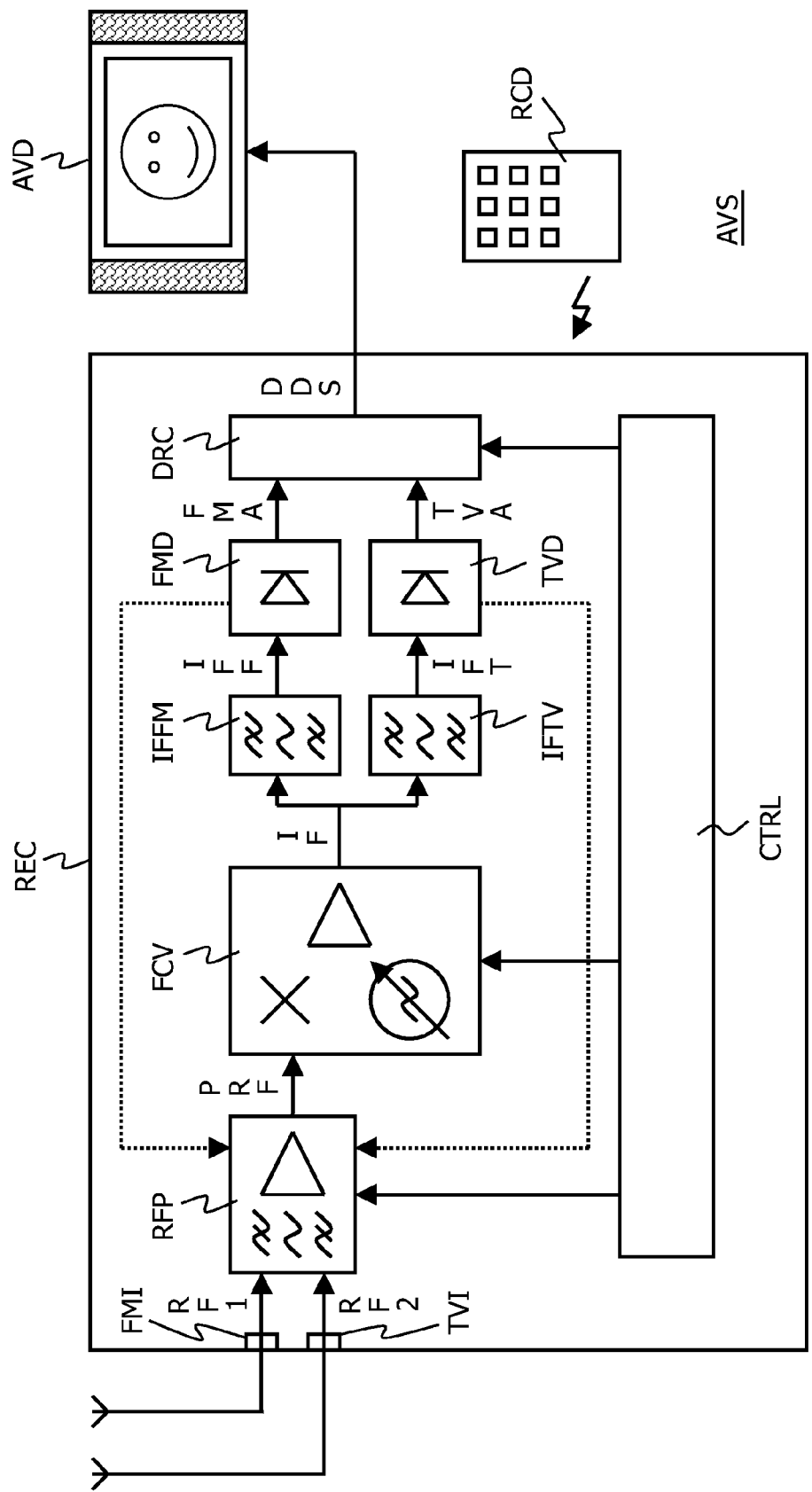
FIG. 1 is a block diagram that illustrates an audiovisual system.

FIG. 1 illustrates an audiovisual system AVS. The audiovisual system AVS comprises a receiver REC, an audiovisual rendering device AVD, and a remote control device RCD. The audiovisual rendering device AVD may be, for example, a flat panel display with stereo loudspeakers. The receiver REC can cause the audiovisual rendering device AVD to render an audio signal from an FM-radio station that the user has selected by means of the remote control device RCD. The audiovisual rendering device AVD may further render the data signal that the FM-radio station broadcasts. The receiver REC can further cause the audiovisual rendering device AVD to render an audiovisual signal from a television (TV) station that the user has selected.

The receiver REC has an FM-radio input FMI and a TV input TVI. The receiver REC comprises a radiofrequency processor RFP, a frequency converter FCV, an FM intermediate frequency filter IFFM, and a TV intermediate frequency filter IFTV. The aforementioned elements may form part of, for example, a tuner module that has a tin can housing. The FM intermediate frequency filter IFFM is preferably a ceramic filter. The TV intermediate frequency filter IFTV is preferably a surface acoustic wave (SAW) filter. The receiver REC further comprises an FM demodulator FMD, a TV demodulator TVD, a driver circuit DRC, and a controller CTRL. The controller CTRL may be in the form of, for example, a suitably programmed microcontroller.

The receiver REC operates as follows. Let it be assumed that the user has selected an FM-radio station by means of the remote control device RCD. The remote control device RCD sends a command to the controller CTRL that indicates the FM-radio station to be selected. In response, the controller CTRL causes the radiofrequency processor RFP to process a radiofrequency spectrum RF1 that is present on the FM-radio input FMI. The radiofrequency spectrum RF1 comprises a radiofrequency signal that originates from the FM-radio station, which the user has selected. This radiofrequency signal will be referred to as selected FM-radio signal hereinafter. The receiver REC operates in an FM mode.

The radiofrequency processor RFP amplifies the selected FM-radio signal and attenuates other signals in the radiofrequency spectrum RF1, in particular signals that are relatively distant in frequency from the selected FM-radio signal. The radiofrequency processor RFP applies a processed radiofrequency spectrum PRF to the frequency converter FCV.

The frequency converter FCV circuit converts the processed radiofrequency spectrum PRF into an intermediate frequency spectrum IF. The intermediate frequency spectrum IF comprises a frequency-shifted version of the selected FM-radio signal. More specifically, the controller CTRL causes frequency converter FCV circuit to carry out a particular frequency shift. This particular frequency shift is so that the frequency-shifted version of the selected FM-radio signal is at a predefined FM intermediate frequency. The predefined FM intermediate frequency is preferably 10.7 Megahertz (MHz).

The FM intermediate frequency filter IFFM filters the intermediate frequency spectrum IF. The FM intermediate frequency filter IFFM has a pass band that is centered on the predefined intermediate frequency, which is preferably 10.7 MHz. The pass band corresponds with the bandwidth of a typical FM-radio signal, which is, for example, 200 kHz. The intermediate frequency filter provides a filtered FM intermediate frequency spectrum IFF that substantially comprises the frequency-shifted version of the desired FM radio signal. Any other signal is attenuated to relatively large extent.

The FM demodulator FMD derives an FM audio signal FMA from the filtered FM intermediate frequency spectrum IFF. The FM demodulator FMD may further derive a data signal, which the FM-radio station broadcasts. In addition, the FM demodulator FMD may provide an FM gain control signal for the radiofrequency processor RFP. FIG. 1 illustrates this by means of a broken line. The gain control signal is representative of signal levels in the filtered FM intermediate frequency spectrum IFF.

The driver circuit DRC applies a rendering driver signal DDS to the audiovisual rendering device AVD. The rendering driver signal DDS has an audio component and a video component. In the FM mode, the audio component comprises an amplified version of the FM audio signal FMA, which represents a broadcast of the FM-radio station that the user has selected. The video component may comprise the data signal, which accompanies the broadcast, or visual information concerning the FM-radio station that the user has selected, or both. The video component may further comprise a suitable visual background with, for example, animations.

Let it now be assumed that the user has selected a TV station. In that case, the radiofrequency processor RFP will process a radiofrequency spectrum RF2 is present at the TV input TVI. This radiofrequency spectrum RF2 comprises a radiofrequency signal that originates from the TV station, which the user has selected. This signal will be referred to as selected TV signal hereinafter. The receiver REC operates in a TV mode.

The radiofrequency processor RFP amplifies the selected TV signal and attenuates other signals in the radiofrequency spectrum RF2, in particular signals that are relatively distant in frequency from the selected TV signal. The radiofrequency processor RFP applies the processed radiofrequency spectrum PRF to the frequency converter FCV, which converts the processed radiofrequency spectrum PRF into the intermediate frequency spectrum IF, similar to the FM mode. The intermediate frequency spectrum IF comprises a frequency-shifted version of the selected TV signal.

In the TV mode, the frequency converter FCV carries out a frequency shift so that the frequency-shifted version of the selected TV signal is at a predetermined TV intermediate frequency. The predetermined TV intermediate frequency can be, for example, 38.9 MHz for a picture carrier, which is comprised in the selected TV signal. The predetermined TV intermediate frequency is thus different from the predetermined FM intermediate frequency, which is 10.7 MHz.

The TV intermediate frequency filter IFTV filters the intermediate frequency spectrum IF. The TV intermediate frequency filter IFTV has a pass band that comprises a picture carrier of the frequency-shifted version of the selected TV signal. The pass band corresponds with the bandwidth of a typical TV signal, which is, for example, 5.5 MHz. The intermediate frequency filter provides a filtered TV intermediate frequency spectrum IFT that substantially comprises the frequency-shifted version of the desired TV signal. Any other signal is attenuated to relatively large extent.

The TV demodulator TVD derives an audiovisual signal TVA from the filtered TV intermediate frequency spectrum rFT. The audiovisual signal TVA comprises a TV video signal and the TV sound signal. In the TV mode, the video component of the rendering driver signal DDS comprises an amplified version of the TV video signal. The video component may also comprise teletext data, which the TV-station that the user has selected broadcast. The audio component comprises the TV sound signal. The TV demodulator TVD may provide a TV gain control signal for the radiofrequency processor RFP. FIG. 1 illustrates this by means of a broken line. The TV gain control signal is representative of signal levels in the filtered TV intermediate frequency spectrum IFT.

Figure 2:
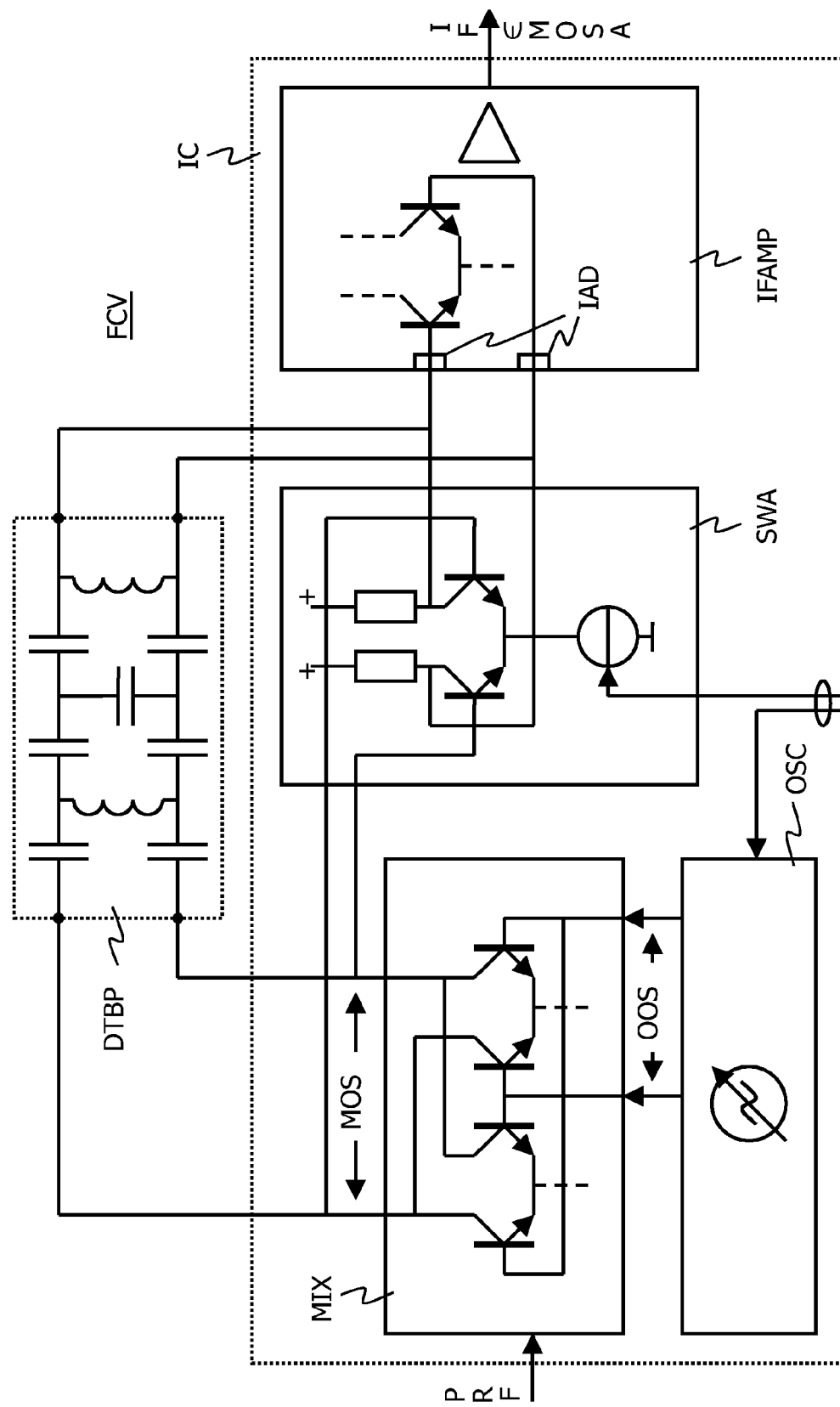
FIG. 2 is a block diagram that illustrates a frequency converter, which forms part of the audiovisual system.

FIG. 2 illustrates the frequency converter FCV. The frequency converter FCV comprises a mixer MIX, an oscillator OSC, a switchable bypass amplifier SWA, and an intermediate frequency amplifier IFAMP. The mixer MIX is preferably a so-called double-balanced mixer, which has a symmetrical signal output. The switchable bypass amplifier SWA and the intermediate frequency amplifier IFAMP are differential amplifiers. The switchable bypass amplifier SWA may comprise, for example, a differential transistor pair with a switchable tail current source. FIG. 2 illustrates the same. FIG. 2 further illustrates that the intermediate frequency amplifier IFAMP has a differential signal input IAD. The aforementioned elements may form part of, for example, an integrated circuit IC. In FIG. 2, a relatively large dotted rectangle represents the integrated circuit IC.

The frequency converter FCV further comprises a double tuned band pass filter DTBP. The double tuned band pass filter DTBP may comprise various inductances and capacitances, which are external to the integrated circuit IC. Such a double tuned band pass filter DTBP can provide a relatively flat pass band that corresponds with the pass band of the TV intermediate frequency filter IFTV illustrated in FIG. 1. A relatively flat pass band allows high-quality TV reception. It should further be noted that the double tuned band pass filter DTBP has a symmetrical structure with a differential signal input, which is coupled to the mixer MIX, and a differential signal output, which is coupled to the differential signal input IAD of the intermediate frequency amplifier IFAMP.

The frequency converter FCV operates as follows. Let it be assumed that the receiver REC, which FIG. 1 illustrates, operates in the TV mode. The oscillator OSC receives a tuning control signal from the controller CTRL. In response, the oscillator OSC provides an oscillator output signal OOS, which has a frequency that is equal to that of the picture carrier in the selected TV signal plus the predetermined TV intermediate frequency. Alternatively, the frequency of the oscillator output signal OOS can be equal to that of the picture carrier in the selected TV signal minus the predetermined TV intermediate frequency.

The mixer MIX mixes the processed radiofrequency spectrum PRF with the oscillator output signal OOS. The mixer MIX provides a mixer output signal MOS, which is a result of the mixing of the two aforementioned signals. The mixer output signal MOS is a differential signal. The mixer output signal MOS comprises the frequency-shifted version of the selected TV signal and other signals, which can be considered as interfering signals.

The radiofrequency processor RFP, which provides frequency selectivity, prevents to a certain extent that relatively strong interfering signals are present in the mixer output signal MOS. This is particularly true for interfering signals whose frequency is relatively distant from that of the selected TV signal. However, the radiofrequency processor RFP is less effective in attenuating interfering signals whose frequency is relatively close to that of the selected TV signal. Consequently, the mixer output signal MOS may still comprise adjacent-frequency signals that are relatively strong.

In the TV mode, the controller CTRL causes the switchable bypass amplifier SWA to be in an off-state. In the off-state, the switchable bypass amplifier SWA constitutes an open circuit, which is coupled between the mixer MIX and the intermediate frequency amplifier IFAMP. That is, the mixer output signal MOS can substantially not reach the differential signal input IAD of intermediate frequency amplifier IFAMP via the switchable bypass amplifier SWA. Any signal transfer via the switchable bypass amplifier SWA results from a signal leakage due to, for example, parasitic capacitances. The switchable bypass amplifier SWA is preferably designed so that the signal leakage is relatively modest. Ideally, the switchable bypass amplifier SWA can be considered not to be present in the TV mode.

In the TV mode, the double tuned band pass filter DTBP constitutes a coupling path via which the mixer output signal MOS substantially reaches the differential signal input IAD of the intermediate frequency amplifier IFAMP. The double tuned band pass filter DTBP attenuates adjacent frequency signals, which may be present in the mixer output signal MOS. A band pass filtered mixer output signal is present at the differential signal input IAD of the intermediate frequency amplifier IFAMP. The intermediate frequency amplifier IFAMP provides an amplified mixer output signal MOSA, which is an amplified version of the band pass filtered mixer output signal. The amplified mixer output signal MOSA comprises the intermediate frequency spectrum IF.

The intermediate frequency amplifier IFAMP has a relatively high gain, in particular if the TV intermediate frequency filter IFTV is a surface acoustic wave filter. The reasons are as follows. A surface acoustic wave filter has a relatively high insertion loss. A signal processing path, which precedes the surface acoustic wave filter, needs to have a relatively high gain in order to prevent a poor noise figure. The signal processing path will inevitably produce intermodulation products due to nonlinearity in signal transfer characteristics. Such intermodulation products constitute interfering signals, which may coincide with spectral components of a desired signal. This will deteriorate signal-to-noise ratio. In general it holds that, the higher the gain the signal processing element is, the stronger the intermodulation products that the signal processing element will produce. A compromise needs to be made between gain and intermodulation.

In the receiver REC, which FIG. 1 illustrates, the radiofrequency processor RFP, the mixer MIX, the double tuned band pass filter DTBP, and the intermediate frequency amplifier IFAMP constitutes the signal processing path the precedes the TV intermediate frequency filter IFTV, which preferably is a surface acoustic wave filter. It has been mentioned hereinbefore that the radiofrequency processor RFP provides some frequency selectivity and that the double tuned band pass filter DTBP provides further frequency selectivity, in particular with regard to adjacent-frequency signals. The intermediate frequency amplifier IFAMP is therefore less susceptible to produce intermodulation products than the mixer MIX and the radiofrequency processor RFP. The gain that is needed to compensate for signal losses in the TV intermediate frequency filter IFTV is preferably concentrated in the intermediate frequency amplifier IFAMP. Accordingly, a better compromise between gain and intermodulation can be achieved, which results in better signal to noise ratio.

Let it now be assumed that the receiver REC operates in the FM mode. In that case, the frequency of the oscillator output signal OOS is equal to that of the selected FM signal plus the predetermined FM intermediate frequency. Alternatively, the frequency of the oscillator output signal OOS can be equal to that of the FM signal minus the predetermined FM intermediate frequency. Like in the TV mode, the mixer MIX provides the mixer output signal MOS, which is a result of the mixing of the two aforementioned signals. The mixer output signal MOS comprises the frequency-shifted version of the selected FM signal and other signals, which can be considered as interfering signals.

In the FM mode, the controller CTRL causes the switchable bypass amplifier SWA to be in an on-state. In the on-state, the switchable bypass amplifier SWA constitutes a coupling path via which the mixer output signal MOS substantially reaches the differential signal input IAD of the intermediate frequency amplifier IFAMP. That is, the double tuned band pass filter DTBP is effectively bypassed in the FM mode. The switchable bypass amplifier SWA scales the mixer output signal MOS. The switchable bypass amplifier SWA may provide a scaling factor that is greater than 1, in which case there is gain, or a scaling factor that is smaller than 1, in which case there is attenuation, or a scaling factor that is substantially equal to 1, in which case there is buffering. A scaled mixer output signal is present at the differential signal input IAD of the intermediate frequency amplifier IFAMP. The amplified mixer output signal MOSA, which the intermediate frequency amplifier IFAMP provides, is an amplified version of the scaled mixer output signal.

Since the switchable bypass amplifier SWA causes the double tuned band pass filter DTBP to be bypassed in the FM mode, the double tuned band pass filter DTBP can be of relatively simple structure and yet provide satisfactory TV reception performance. Let it be assumed, for example, that the switchable bypass amplifier SWA were not present and that the double tuned band pass filter DTBP is replaced by a combined FM/TV filter. Such a combined FM/TV filter would need to have a pass band at the predetermined FM intermediate frequency, which may be 10.7 MHz, and a pass band at the TV intermediate frequency, which may be 38.9 MHz for the picture carrier. A relatively complicated filter structure would be required to achieve a relatively flat pass band at the TV intermediate frequency. Conversely, the pass band at the TV intermediate frequency will have an amplitude characteristic that varies to relatively great extent if a simple filter structure is used comparable with that of the double tuned band pass filter DTBP. Such a rough pass band does not allow high-quality TV reception. In contradistinction, the double tuned band pass filter DTBP allows high quality TV reception, which may coexist with satisfactory FM radio reception.

Figure 3:
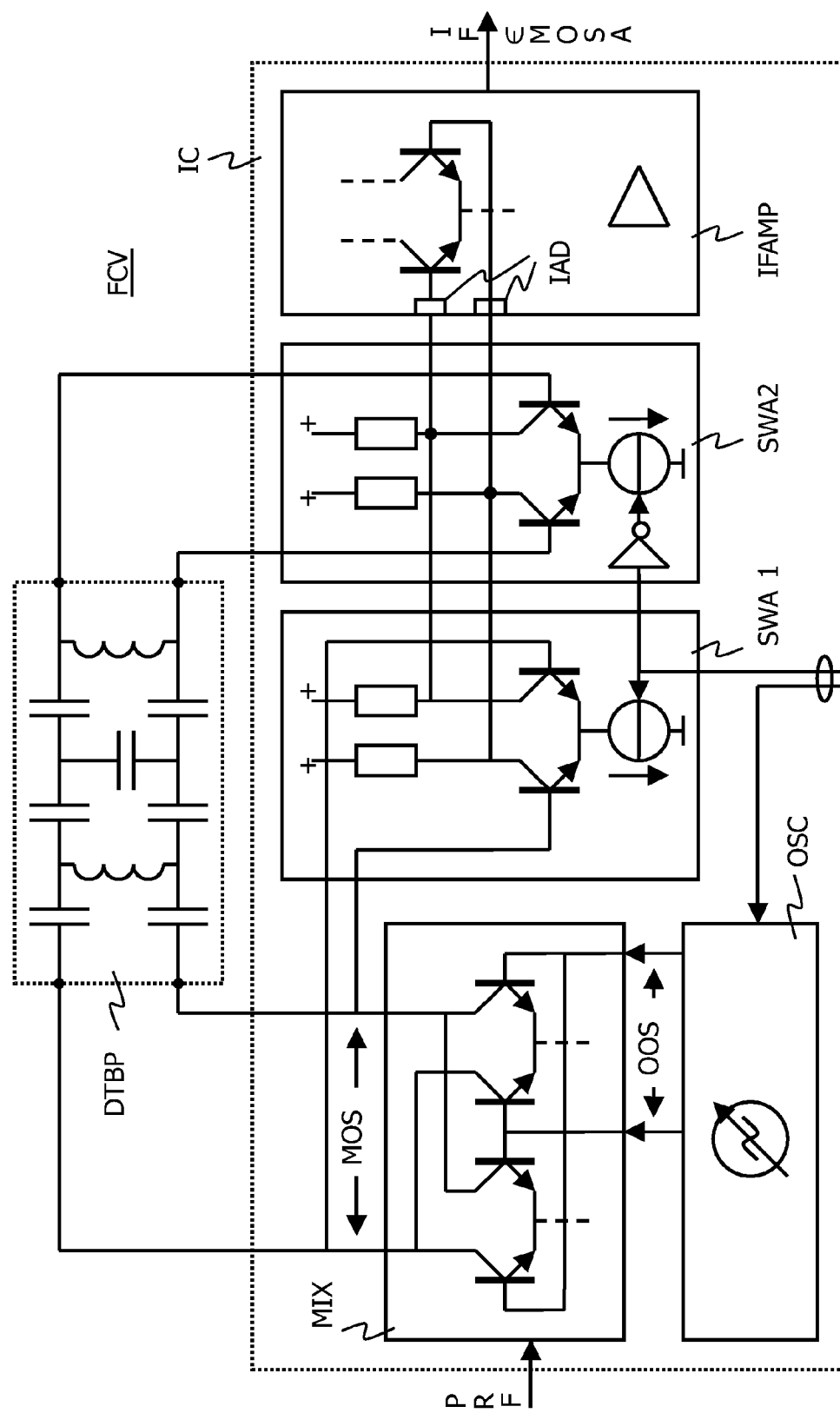
FIG. 3 is a block diagram that illustrates an alternative implementation of the frequency converter.

FIG. 3 illustrates an alternative implementation of the frequency converter FCV. Like reference signs denote like elements. The alternative implementation comprises two switchable amplifiers SWA1, SWA2. In the FM mode, switchable amplifier SWA1 is in the on state, whereas switchable amplifier SWA2 is in the off state. In the TV mode, the opposite is the case: switchable amplifier SWA2 is in the on state, whereas switchable amplifier SWA1 is in the off state. The alternative implementation has an advantage with regard to the frequency converter FCV that FIG. 2 illustrates. In the latter frequency converter FCV, the double tuned band pass filter DTBP constitutes a feedback path for the switchable bypass amplifier SWA. This poses a constraint on the double tuned band pass filter DTBP, which should be designed such that oscillations and other spurious effects are prevented. In the alternative implementation, such a feedback path does not exist, which removes the aforementioned constraint and provides a better safety margin.

Concluding Remarks

The detailed description hereinbefore with reference to the drawings illustrates the following characteristics, which are cited in various independent claims. A receiver (REC) can handle different types of reception signals (TV and FM-radio). In the receiver (REC), a mixer (MIX) mixes a reception signal with an oscillator signal (OOS) so as to obtain a mixer output signal (MOS), which comprises a frequency-shifted version of the reception signal. An intermediate frequency amplifier (IFAMP) applies an amplified mixer output signal (MOSA) to two different intermediate frequency filters (IFTV, IFFM): one (IFTV) for first type reception signals and another (IFFM) for second type reception signals. A switchable coupling section (DBTP, SWA) is coupled between the mixer (MIX) and the intermediate frequency amplifier (IFAMP). The switchable coupling section (DBTP, SWA) is switchable to a first state and a second state. In the first state, the mixer output signal (MOS) substantially reaches an input (IAD) of the intermediate frequency amplifier (IFAMP) via a first coupling path (DTBP). In the second state, the mixer output signal (MOS) substantially reaches the input (IAD) of the intermediate frequency amplifier (IFAMP) via a second coupling path (SWA).

The detailed description hereinbefore further illustrates various optional characteristics, which are cited in the dependent claims. These characteristics may be applied to advantage in combination with the aforementioned characteristics. Various optional characteristics are highlighted in the following paragraphs. Each paragraph corresponds with a particular dependent claim.

The first coupling path (DTBP) comprises a filter for the first type reception signals. This further contributes to relatively good reception quality.

The second coupling path (SWA) comprises an amplifier. This further contributes to relatively good reception quality.

The switchable coupling section (DBTP, SWA) comprises a switch that is coupled in parallel with the filter for the first type reception signals. The switch forms part of the second coupling path (SWA) when the switch is in a closed state. This allows cost-efficient implementations.

The switch is in the form of an amplifier that can be switched on and off. This allows cost efficient implementations, in particular cost efficient integrated circuit implementations.

The aforementioned characteristics can be implemented in numerous different manners. In order to illustrate this, some alternatives are briefly indicated.

The aforementioned characteristics may be applied to advantage in any type of receiver. A combined TV/FM receiver is merely an example. The aforementioned characteristics may equally be applied in, for example, a receiver for receiving digital audio broadcast (DAB) signals as well as conventional FM-radio signals. As another example, a combination of TV, DAB, and FM-radio is also possible. Yet another example is a cellular phone that offers FM-radio reception.

The coupling section can be implemented in numerous different manners. For example, referring to FIG. 2, the switchable bypass amplifier SWA may be replaced by a switch, which is external to the integrated circuit IC and coupled in parallel with the double tuned band pass filter DTBP. The coupling section may comprise a filter for one type of reception signal and another filter for another of reception signal. For example, referring to FIG. 3, an FM filter may be coupled between the mixer MIX and switchable amplifier SWA1 or between switchable amplifier SWA1 and the intermediate frequency amplifier IFAMP.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A receiver arranged to receive different types of reception signals, the receiver comprising:
   a mixer arranged to mix a reception signal with an oscillator signal so as to obtain an mixer output signal, which comprises a frequency-shifted version of the reception signal;
   an intermediate frequency amplifier arranged to apply an amplified mixer output signal to two different intermediate frequency filters, one intermediate frequency filter for first type reception signals and another intermediate frequency filter second type reception signals; and
   a switchable coupling section arranged between the mixer and the intermediate frequency amplifier, the switchable coupling section being switchable, in response to a command indicative of one of the types, to a first state in which the mixer output signal substantially reaches an input of the intermediate frequency amplifier via a first coupling path comprising a filter for the first type reception signals, and to a second state in which the mixer output signal substantially reaches the input of the intermediate frequency amplifier via a second coupling path, wherein the switchable coupling section comprises a switch that is coupled in parallel with the filter for the first type reception signals, the switch forming the second coupling path when the switch is in a closed state.

2. A receiver according to claim 1, the second coupling path comprising an amplifier.

3. A receiver according to claim 1, the switch being in the form of an amplifier that can be switched on and off.

4. A receiver according to claim 1, the receiver being arranged to receive TV signals and FM radio signals, the one intermediate frequency filter having a bandwidth corresponding to that of a typical TV signal, the other intermediate frequency filter having a bandwidth corresponding to that of a typical FM radio signal.

5. An audiovisual system comprising a receiver according to claim 1 and an audiovisual rendering device for rendering a signal that the receiver has derived from reception signal.

6. A receiver according to claim 1, further including a circuit configured and arranged for providing the command.

7. A receiver according to claim 6, wherein the circuit for providing the command is configured and arranged to indicate one of different modes including and audio visual signal mode and an audio mode that does not support video signals.

8. A receiver according to claim 7, wherein the audio visual signal mode is a TV mode.

9. A receiver according to claim 7, wherein the audio mode is an FM radio mode.

10. A receiver according to claim 7, wherein the audio visual signal mode is a TV mode and wherein the audio mode is an FM radio mode.

11. A receiver according to claim 10, wherein the circuit is further configured and arranged to provide the command in response to a user selection of one of the modes.

12. A method of controlling a receiver arranged to receive different types of reception signals, the receiver including:
   a mixer arranged to mix a reception signal with an oscillator signal so as to obtain an mixer output signal, which comprises a frequency-shifted version of the reception signal;
   an intermediate frequency amplifier arranged to apply an amplified mixer output signal to two different intermediate frequency filters, one intermediate frequency filter for first type reception signals and another intermediate frequency filter second type reception signals; and
   a switchable coupling section arranged between the mixer and the intermediate frequency amplifier, the coupling section being switchable to a first state in which the mixer output signal substantially reaches an input of the intermediate frequency amplifier via a first coupling path comprising a filter for the first type reception signals, and to a second state in which the mixer output signal substantially reaches the input of the intermediate frequency amplifier via a second coupling path, the switchable coupling section comprising a switch that is coupled in parallel with the filter for the first type reception signals, the switch forming the second coupling path when the switch is in a closed state, the method comprising:
   a control step of switching the switchable coupling section to the first state or to the second state in response to a command corresponding with a selection of a reception signal of the first type or the second type, respectively.

13. A computer program product stored on a tangible medium for a receiver arranged to receive different types of reception signals, the receiver comprising:
   a mixer arranged to mix a reception signal with an oscillator signal so as to obtain an mixer output signal, which comprises a frequency-shifted version of the reception signal;
   an intermediate frequency amplifier arranged to apply an amplified mixer output signal to two different intermediate frequency filters, one intermediate frequency filter for first type reception signals and another intermediate frequency filter second type reception signals; and
   a switchable coupling section arranged between the mixer and the intermediate frequency amplifier, the coupling section being switchable to a first state in which the mixer output signal substantially reaches an input of the intermediate frequency amplifier via a first coupling path, and to a second state in which the mixer output signal substantially reaches the input of the intermediate frequency amplifier via a second coupling path,
   the computer program product comprising a set of instructions that, when loaded into the receiver, causes the receiver to carry out the method according to claim 12.

* * * * *